United States Patent Office 3,371,955
Patented Mar. 5, 1968

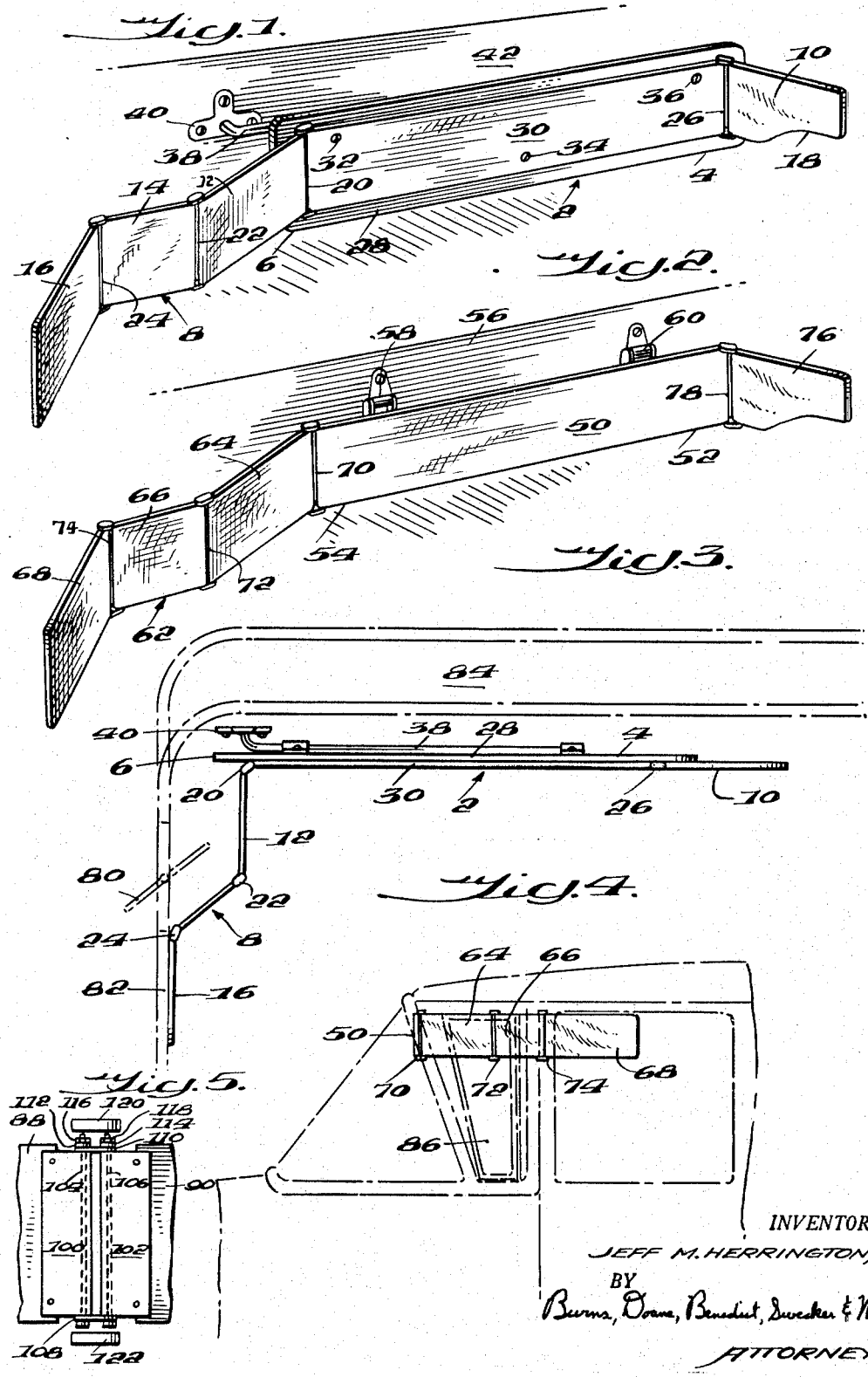

3,371,955
SAFETY SHADE
Jeff M. Herrington, Sr., 1724 E. Brainard St.,
Pensacola, Fla. 32503
Filed Oct. 19, 1965, Ser. No. 497,804
13 Claims. (Cl. 296—97)

ABSTRACT OF THE DISCLOSURE

An adjustable light shielding structure for installation in the interior of a vehicle is provided which possesses improved shading capabilities without the concomitant interference with the comfort of a driver or passenger in other respects, particularly during summer driving. The adjustable and substantially continuous safety shade comprises a central visor, an outer auxiliary visor possessing articulated panels, hinges for pivotally connecting the outer auxiliary visor adjacent the outer extremity of the central visor and the adjoining articulated panels to each other, and means adapted for connecting the central visor to a vehicle.

---

The present invention concerns a shielding structure designed to block annoying light rays entering a vehicle from the front and side of a person or observer present at a forward location within the vehicle. More particularly, the present invention relates to a visor-type light shielding device possessing adjustable features designed to provide improved service to a driver or front seat passenger of a vehicle.

It has been recognized that a prime cause of traffic accidents has been the inability of drivers accurately and promptly to observe driving hazards. One factor which has contributed significantly to inaccurate or delayed observation has been the temporary loss or impairment of vision resulting from light rays directed from the front and/or side of the driver. Examples of such light rays which cause the greatest hazard are recognized as emanating from the rising or setting sun, or the headlights of approaching vehicles. It is not uncommon for a driver to occasionally find himself in a situation where a vehicle approaching at close range from the front or side is utilizing improperly adjusted headlight beams, or bright single or dual highway headlight beams. The unexpected temporary loss or impairment of vision in such instances sometimes results in grave consequences particularly if the driver finds himself on an unfamiliar or curving roadway and is traveling at a high rate of speed. Even if spared a potential accident the driver and his front seat passengers find a trip more enjoyable if the inconvenience caused by annoying light rays is eliminated.

In an effort to meet the problems presented to drivers and passengers by annoying light rays numerous types of shielding devices have been proposed for permanent attachment within vehicles. For instance, it is common practice for nearly every automobile manufactured in the United States to be provided with a pair of visors adjustably mounted within the automobile above the windshield. Such visors may commonly be pivoted so as to block light entering either from the front or from the side. United States Patent No. 3,085,827 to Cederberg et al. discloses the positioning of a deformable glare shield extension upon a conventional automobile visor in order to block additional light rays entering from an upper corner of a wraparound windshield. United States Patent Nos. 1,898,276 to Van Dresser, 2,485,440 to Friedheim, 2,823,950 to Harris, and 2,965,415 to Dryden, are representative of patents which disclose the utilization of an adjustable, but rigid side flap situated at one or both ends of a central visor in order to provide further light shielding. While such devices offer a margin of safety to those installing the same, a need has remained for a compact and efficient light shielding device which will not concurrently interfere with the driver's comfort in other respects, particularly during summer driving.

It is an object of the present invention to provide an improved light shielding device which when employed to block light rays entering from the side will not interfere with the efficient operation of an opened side vent window of a vehicle.

It is another object of the present invention to provide a continuous improved light shielding device capable of efficiently blocking light rays entering from the front and side of a driver or a front seat passenger of a vehicle.

It is a further object of the invention to provide an improved light shielding device the configuration of which may be conveniently varied depending upon the severity and location of an exterior light source.

It is another object of the invention to provide a light shielding device which when employed to block light rays entering from the side may have the side extremity thereof situated immediately adjacent the side of the vehicle thus providing maximum headroom for the user even though a nearby side vent window is opened.

It is still another object of the invention to provide an improved light shielding device which may be compactly stored when not in use.

It is an additional object of the invention to provide an improved light shielding device which may, if desired, be readily attached to a conventional rigid visor of a vehicle already in service.

These and other objects, as well as the scope, nature and utilization of the invention will become more clearly apparent from the following description, and appended claims.

It has been discovered that troublesome light rays entering a vehicle from the front and side of a driver or passenger located in a forward area of the vehicle may be effectively blocked by providing an adjustable and substantially continuous safety shade according to the invention comprising a central visor, an outer auxiliary visor possessing articulated panels, hinges for pivotally connecting the outer auxiliary visor to the central visor portion and the adjoining articulated panels to each other, and means adapted for connecting the central visor portion to a vehicle. In a particularly preferred embodiment of the invention an inner or second auxiliary visor is advantageously utilized.

The present invention is particularly suited for use in conjunction with auotmobiles, and finds its greatest utility when installed in automobiles designed so that an upper portion of a side vent window by necessity extends within the automobile when opened. However, vent windows of all automobiles will operate more efficiently when the instant safety shade is employed rather than the usual rigid visor to block light rays entering from the side. The instant safety shade may also be utilized with other vehicles where similar shielding problems are presented. Examples of such additional vehicles may include trucks, military vehicles, and certain yachts, and ships.

When the instant invention is employed to block light directed from the side, the controlled circulation of fresh air within the vehicle created by the vent window is largely unimpaired, and the extremity of the outer auxiliary shield is capable of being positioned immediately adjacent the side of the vehicle in order to provide maximum headroom. The corner post of the vehicle is effectively avoided by the safety shade and substantially continuous shielding is provided without significant interruption across the front and side range of vision. The present invention may be conveniently brought into service for daytime or nighttime use to meet the varied shading needs of a driver or his passengers.

FIGURE 1 is a perspective view of a preferred embodiment of the invention mounted in front of the driver's seat in conjunction with a conventional automobile visor.

FIGURE 2 is a perspective view of a preferred embodiment of the invention in which the central visor of the safety shade is atttached directly to the upper windshield molding of an automobile in front of the driver's seat.

FIGURE 3 is a top plan view of the preferred embodiment of the invention shown in FIGURE 1, when in operative position to provide maximum shielding for the driver in an automobile while the side vent window is functioning.

FIGURE 4 is an exterior side elevation view of an automobile showing the embodiment of the invention of FIGURE 2 in an operative position in front of the driver's seat while the side vent window is functioning. The portion of automobile shown is outlined in phantom lines.

FIGURE 5 is a side elevation view of a friction hinge which may be advantageously utilized as the hinge means in safety shades according to the invention.

Referring to FIGURE 1 central visor 2 having inner end 4 and outer end 6 is provided with an outer auxiliary visor 8, and an inner or second auxiliary visor 10. In this particularly preferred embodiment of the invention the outer auxiliary visor 8 comprises a first panel 12, a second panel 14, and a third panel 16. It is not essential for an improved safety shade acccording to the invention to be provided with the third panel 16 which is included in the preferred embodiments shown in each of the drawings. The inner or second auxiliary visor 10 if desired may be curved or contoured 18 to accommodate a rear view mirror. The exact configuration of the inner or auxiliary visor 10 is determined by the general configuration of the rear view mirror (not shown) which it is designed to abut. The general function of inner auxiliary visor 10 is to provide shielding from light rays which may enter above and adjacent a conventional rear view mirror. If the user is primarily concerned with the improved blocking of light rays which enter from the side, this auxiliary visor 10 may likewise be omitted from the particularly preferred embodiments of the invention shown in the drawings. First hinge 20, second hinge 22, and third hinge 24 connect first panel 12 adjacent the outer end 6 of central visor 2, and the respective panels 12, 14 and 16 of the outer auxiliary visor 8 to each other. Hinge 26 connects the inner or second auxiliary visor 10 adjacent the inner end 4 of central visor 2. The hinges 20, 22, 24 and 26 utilized in the safety shade may preferably be friction hinges. The term "friction hinge" is to be so construed as encompassing all hinges which require the application of a substantial force to impart a pivoting movement. In free condition such hinges tend to remain in a fixed position. Any freely pivoting hinge which is provided with a suitable locking mechanism may be likewise utilized. The hinges should preferably be of a configuration which is capable of preventing the passage of an appreciable quantity of light rays, and thus enable the safety shade to provide a substantially continuous band of light shielding. The central visor 2 comprises an interior automobile visor 28 and a second visor 30. The second visor 30 is generally coextensive with the interior automobile visor 28 and may be firmly attached to the rear surface thereof by any suitable means such as bolts 32, 34, and 36. Arm 38 and bracket 40 connect the central visor 2 to windshield molding 42. When not in use the outer auxiliary visor 8 is folded so that it lies adjacent second visor 30, and inner auxiliary visor 10 is folded to overlap a portion of the third panel 16 to form a compact structure. The central visor 2 may then be rotated about arm 38 to a position above the windshield for convenient storage. In order to facilitate compact storage, the total length of outer auxiliary visor 8 should preferably not exceed that of central visor 2. The lengths of the individual panels utilized may be varied to meet the specific needs of a given group of users, as can the length of the central visor and inner auxiliary visor.

In FIGURE 2 central visor 50 having inner end 52 and outer end 54 may be connected to molding 56 by friction hinges 58 and 60 or any other suitable means capable of maintaining the safety shade in the desired position. Outer auxiliary visor 62 comprises a first panel 64, a second panel 66, and a third panel 68 which are joined to each other and to the outer end 54 of central visor 50 by hinges 70, 72, and 74. Inner auxiliary shield 76 is connected to the inner end 52 of central visor 50 by hinge 78. As discussed with reference to the embodiment shown in FIGURE 1, the third panel 68, and the inner auxiliary visor 76 shown in the preferred embodiment of FIGURE 2 may be omitted.

In FIGURE 3 the outer auxiliary visor 8 is shown as it successfully circumvents an opened vent window 80 to provide improved shielding without appreciably interfering with ventilation provided by the vent window 80. Since the third panel 16 is capable of being positioned immediately adjacent the side of the automobile 82, no loss of head room results. The windshield of the automobile is designated generally at 84. In FIGURE 4 vent window 86 is in an open position and the embodiment of the invention discussed in connection with FIGURE 2 is shown in position for providing maximum shielding.

The friction hinge of FIGURE 5 may be formed by providing panels 88 and 90 with extension means 100 and 102 which are formed to encompass the shaft portion of bolts 104 and 106. The extension means 100 and 102 may be formed from a bendable sheet material, such as sheet aluminum of an appropriate thickness, which is secured by bolts, rivets, or any other suitable means, to each side of panels 88 and 90 adjacent the adjoining ends thereof to form channels for the bolts 104 and 106. The bolts 104 and 106 are inserted through apertures (not shown) in plate means 108, through the channels formed by extension means 100 and 102, through apertures (not shown) formed in plate means 110, and through lock washers 112 and 114. Nuts 116 and 118 are then secured to bolts 104 and 106 to produce an appropriate friction engagement between plates 108 and 110, and extension means 100 and 102 to restrain the free movement of panels 88 and 90 with respect to each other. Cap means 120 and 122 which are shown in an exploded relationship to the hinge may engage plate means 108 and 110. If desired, however, cap means 120 and 122, as well as lock washers 112 and 114 may be omitted.

It is recommended that at least the peripheral surfaces of the central and auxiliary visors be formed of a yieldable material (not shown) to introduce an added measure of safety to the user. A layer of sponge rubber covered with a durable fabric of resinous covering is particularly preferred to form the peripheral surfaces.

In each embodiment of the invention shown in the drawings, a safety shade for use by a driver has been shown. It is to be understood however, that the basic elements of the invention are equally adaptable to the production of safety shades for use by passengers.

Although the invention has been described with preferred embodiments, it is to be understood that further variations and modifications may be resorted to as will be apparent to those skilled in the art. Such variations and modifications are to be considered within the purview and scope of the claims appended hereto.

I claim:

1. A safety shade capable of blocking light rays entering a vehicle from the front and side of an observer present in a forward area of the vehicle comprising a central visor means having inner and outer ends, an auxiliary visor adapted to be positioned in a generally perpendicular relation to said central visor means and to circumvent an opened side vent window, said auxiliary visor comprising first and second panels having inner and outer ends, first hinge means pivotally connecting said inner end of said first panel adjacent to said outer end of said central visor means, second hinge means pivotally connecting said outer end of said first panel to said inner end of said second panel, and means adapted for connecting said central visor means to a vehicle.

2. A safety shade according to claim 1 in which the auxiliary visor further comprises a third panel having inner and outer ends, and third hinge means pivotally connecting said outer end of said second panel to said inner end of said third panel.

3. A safety shade according to claim 1 which is further provided with a second auxiliary visor, and hinge means pivotally connecting said second auxiliary visor adjacent to said inner end of said central visor means.

4. A safety shade according to claim 1 wherein said central visor means includes an interior automobile visor having forward and rear surfaces, and a second visor means generally coextensive with said interior automobile visor and attached to the rear surface thereof.

5. A safety shade according to claim 1 wherein each hinge means includes friction means to restrain relative movement between the elements thereof.

6. A safety shade according to claim 1 wherein said central visor means and said auxiliary visor include peripheral surfaces formed of yieldable material.

7. A safety shade capable of blocking light rays entering a vehicle from the front and side of an observer present in a forward area of the vehicle comprising a central visor means having inner and outer ends, an outer auxiliary visor adapted to be positioned in a generally perpendicular relation to said central visor means and to circumvent an opened side vent window, said auxiliary visor comprising first, second, and third panels having inner and outer ends, first hinge means pivotally connecting said inner end of said first panel adjacent to said outer end of said central visor means, second hinge means pivotally connecting said outer end of said first panel to said inner end of said second panel, third hinge means pivotally connecting said outer end of said second panel to said inner end of said third panel, an inner auxiliary visor, hinge means for pivotally connecting said inner auxiliary visor adjacent the inner end of said central visor means, and means adapted for connecting said central visor means to a vehicle.

8. A safety shade according to claim 7 wherein said central visor means includes an interior automobile visor having forward and rear surfaces, and a second visor means generally coextensive with said interior automobile visor and attached to the rear surface thereof.

9. A safety shade according to claim 7 wherein the total length of said outer auxiliary visor does not exceed that of said central visor means.

10. A safety shade according to claim 7 wherein each hinge means includes friction means to restrain relative movement between the elements thereof and is capable of preventing the passage of an appreciable quantity of light rays.

11. A safety shade according to claim 7 wherein said central visor means, said outer auxiliary visor, and said inner auxiliary visor include peripheral surfaces formed of a yieldable material.

12. A safety shade according to claim 7 wherein the total length of said outer auxiliary visor approximates that of said central visor means, and said outer auxiliary visor is capable of being held in compact overlapping engagement by said inner auxiliary visor when neither auxiliary visor is utilized to block light rays.

13. A safety shade according to claim 12 wherein the configuration of the inner auxiliary visor includes a curved surface to accommodate a rear view mirror.

References Cited

UNITED STATES PATENTS 1,746,334   2/1930   Bollesen _____ 296—97

BENJAMIN HERSH, *Primary Examiner.*

J. A. PEKAR, *Assistant Examiner.*